E.B. Bigelow

Sheet 1.
5 Sheets.

Power Loom

No. 145.

Reissued Sept. 25, 1849.

E.B. Bigelow.
Sheet 2, 5 Sheets.
Power Loom.
No. 145. Reissued Sept. 25, 1849.
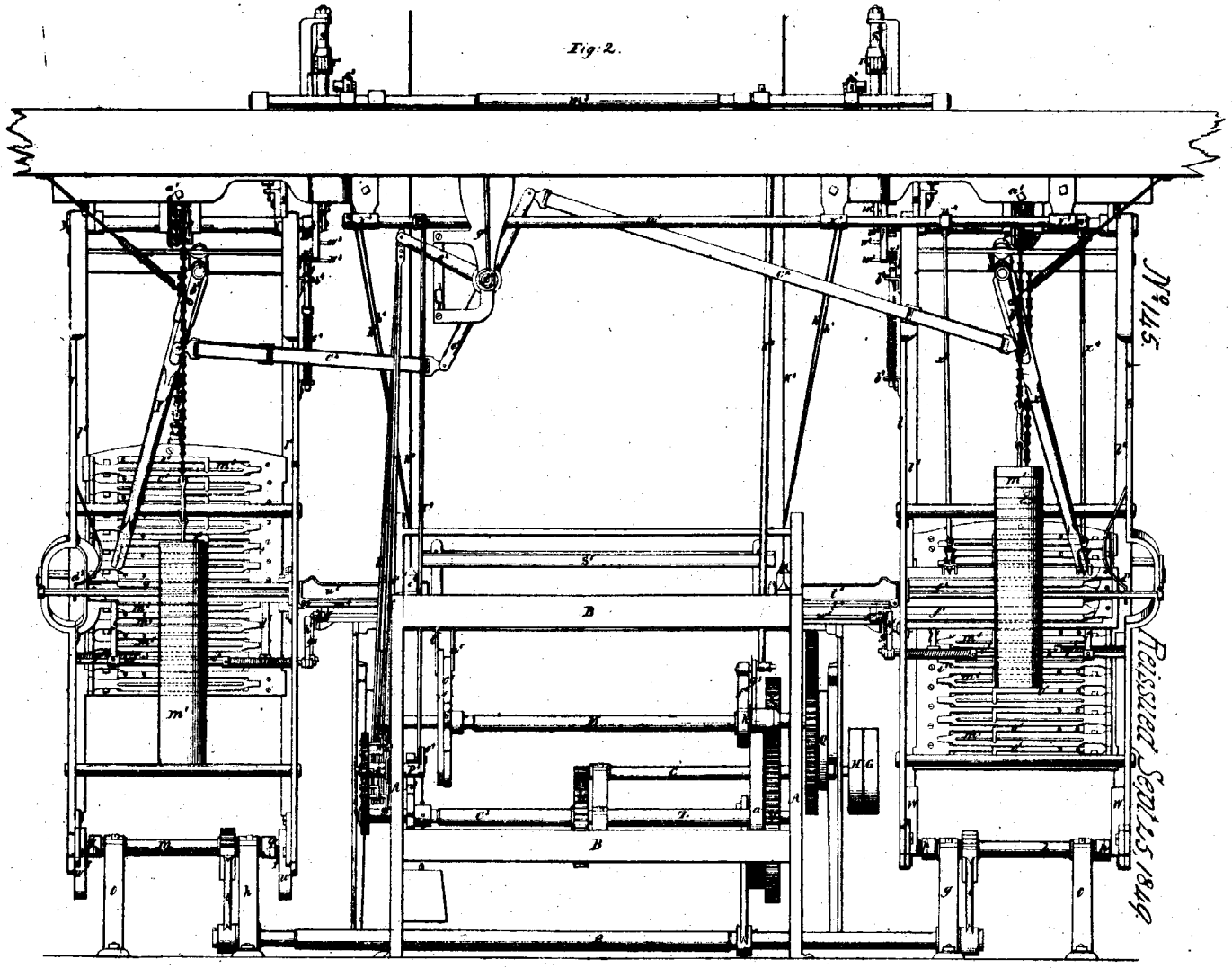

E. B. Bigelow.
Sheet 3.
5 Sheets.
Power Loom.
No. 145.
Reissued Sept. 25, 1849.
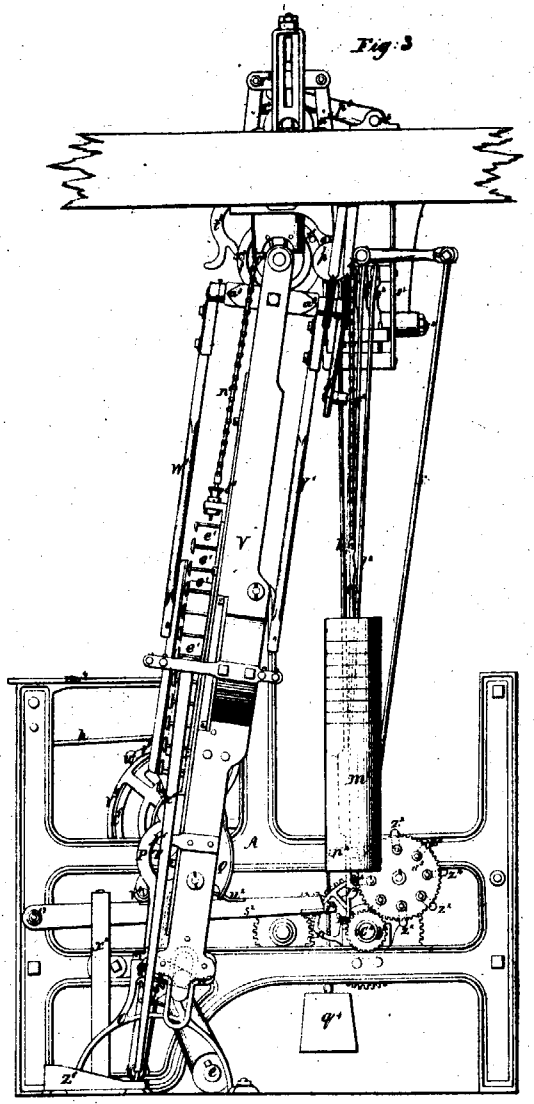
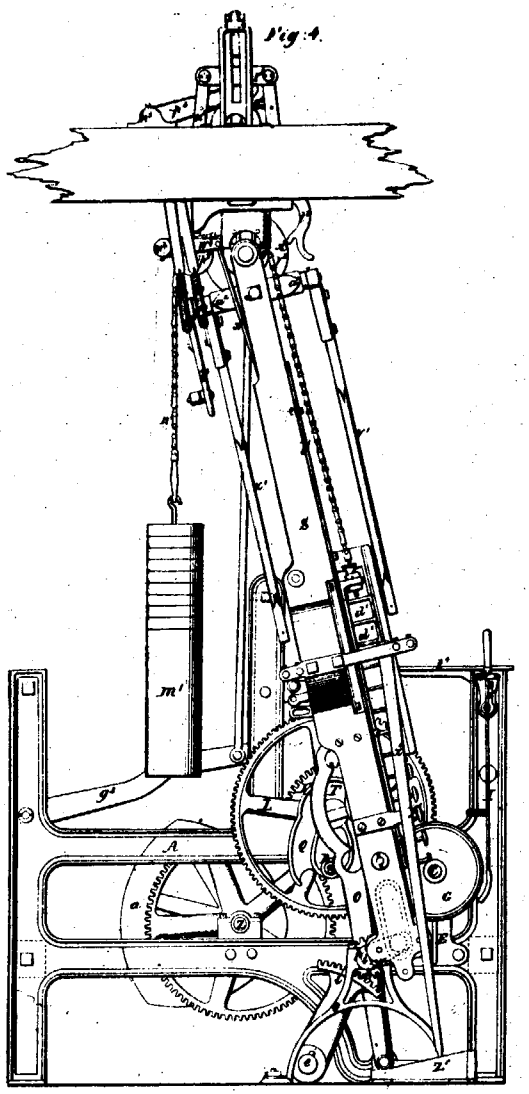

E. B. Bigelow

Sheet 4, 5 Sheets

Power Loom

No. 145.

Reissued Sept. 25, 1849.

E. B. Bigelow.
Power Loom.
Sheet 5, 5 Sheets.
No. 145. Reissued Sept. 25, 1849.
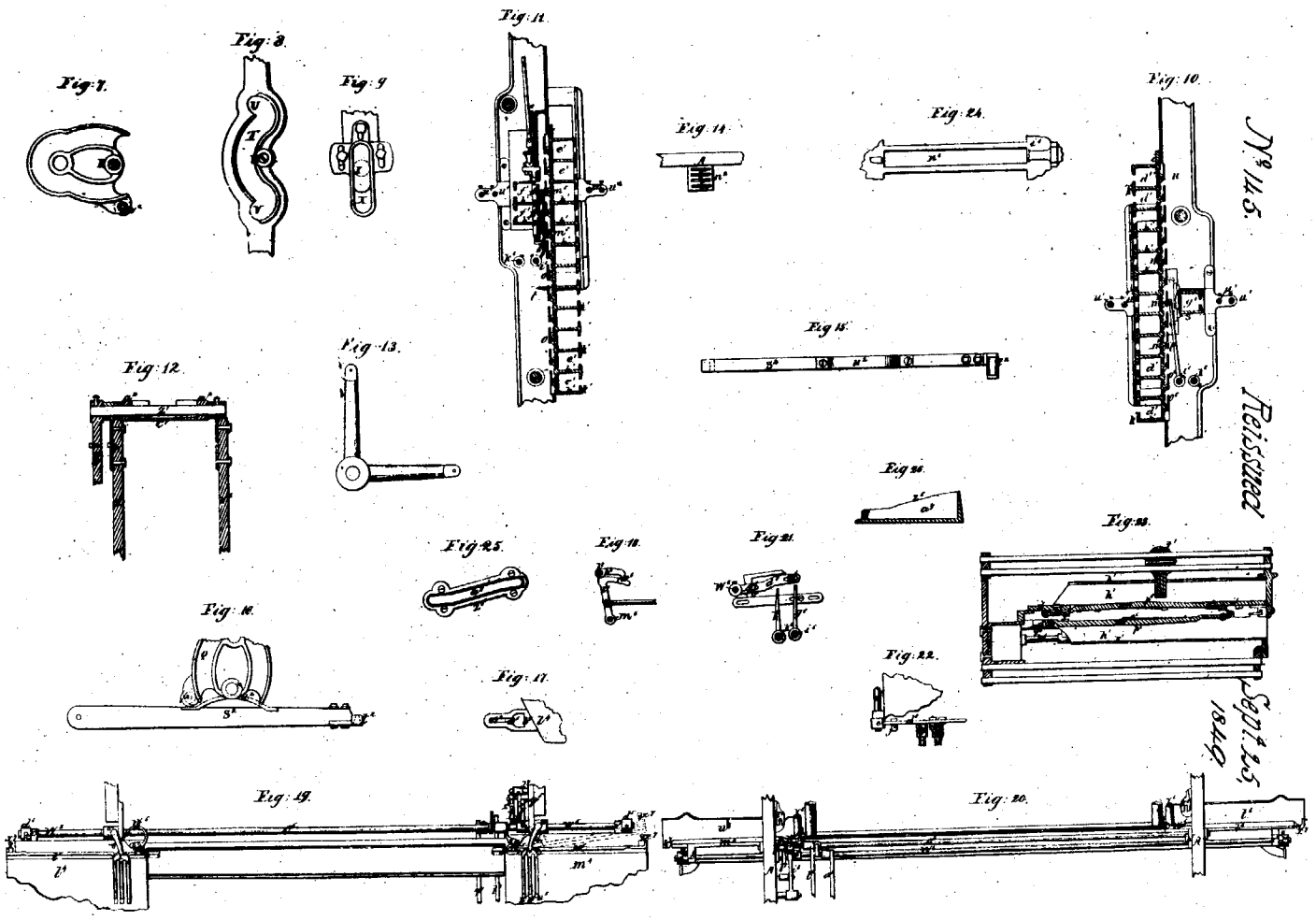

UNITED STATES PATENT OFFICE.

ERASTUS B. BIGELOW, OF CLINTONVILLE, MASSACHUSETTS.

IMPROVEMENT IN LOOMS.

Specification forming part of Letters Patent No. 4,696, dated February 18, 1846; Reissue No. 145, dated September 25, 1849.

*To all whom it may concern:*

Be it known that I, ERASTUS B. BIGELOW, of Clintonville, in the county of Worcester and State of Massachusetts, have invented certain new and useful improvements in the power-loom for weaving two or three ply carpets and other figured fabrics; and I hereby declare that the following is a full, clear, and exact description of the principle or character which distinguishes them from all other things before known, and of the manner of making, constructing, and using the same, reference being had to the accompanying drawings, making part of this specification, in which—

Figure 1:
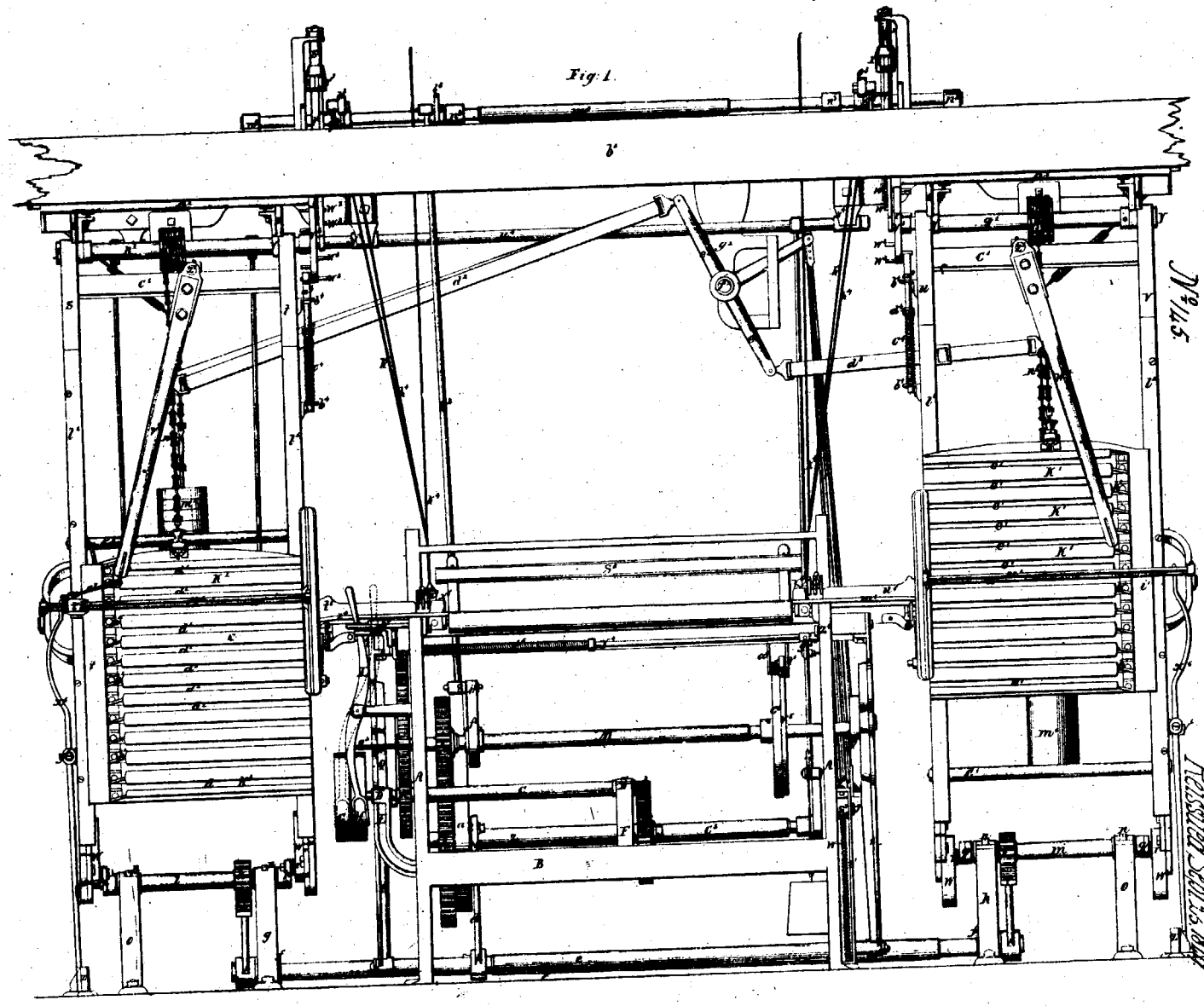
Figure 5:
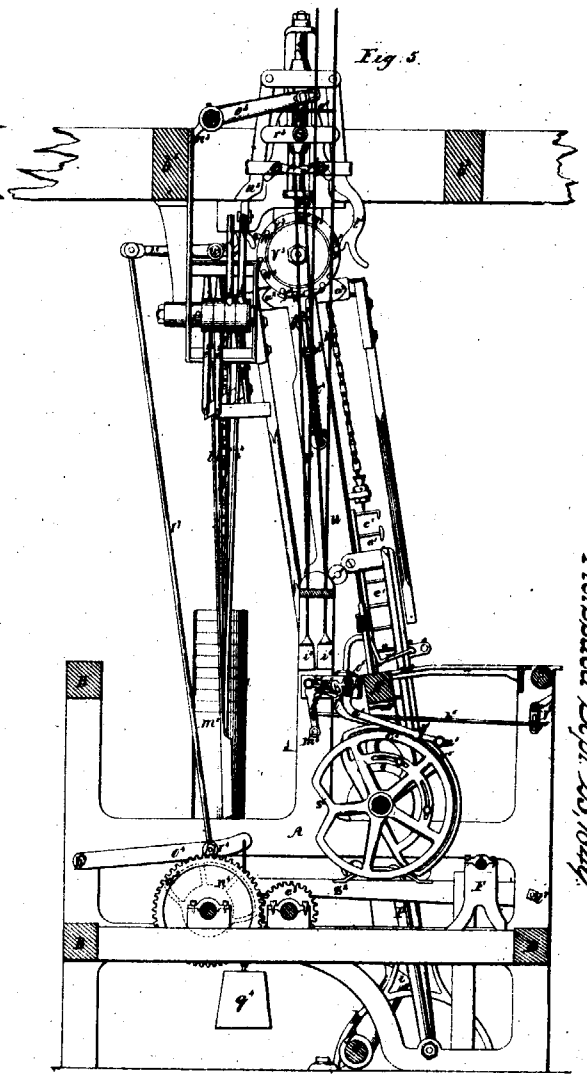
Figure 6:
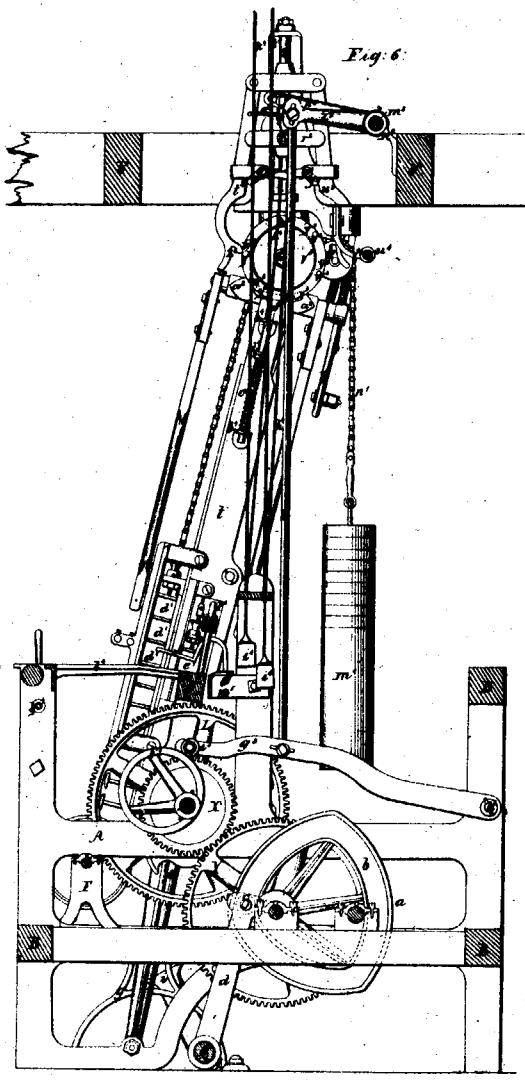

Figure 1 is a front elevation of a carpet-loom on my improved plan; Fig. 2, an elevation of the back; Fig. 3, an elevation of the right-hand end; Fig. 4, an elevation of the left-hand end. Fig. 5 is a central vertical section, looking toward the right end; and Fig. 6 is another like section, looking in the opposite direction.

The other figures will be referred to in their appropriate places.

The same letters indicate like parts in all the figures.

In my improved loom the shuttle-boxes are in separate and independent frames by the side of the lay; hence when the shuttles are thrown the lay must be at rest and in a position relatively to the shuttle-boxes which shall always be the same; but the power required to work the lay is very great, particularly in heavy carpet-looms, and the parts employed in working the lay are in consequence much exposed to wear and strain. If the same means be used for holding the lay in a fixed position during the throw of the shuttle and for beating, wear and strain would be liable to put it out of true.

It is the object of the first part of my invention to avoid this difficulty; and to this end my invention consists in using one cam and roller to work the lay and another to hold it in the fixed position during the throw of the shuttle, one of the said cams being on the lay-shaft, and the roller which works in connection with it on the lay, and the other cam on the lay and its roller or wrist attached to the first cam; one of the cams being concentric to hold the lay in a fixed position during a part of the rotation and during the time the shuttle is thrown, with its ends eccentric, that the roller may enter and leave it as the lay is either gradually started or gradually arrested, and the other cam being of any form that may be desired to give to the lay the varying motions required, and with its ends adapted to receive and liberate the roller which it operates. By this means the cam and roller which operate the lay, and which are exposed to all the wear and strain, are not used to hold the lay in place during the throw of the shuttle, this being done by the other cam, which, being concentric, has no strain upon it, as its object is simply to hold the lay in a state of rest.

I have combined in one loom two series of shifting shuttle-boxes and two stationary or receiving shuttle-boxes—that is, one series of shifting shuttle-boxes and one receiving shuttle-box on each side of the loom, and hung on separate frames independent of the lay of the loom; but for many kinds of fabrics four series of shifting shuttle-boxes are required; and the second part of my invention consists in combining with a power-loom four series of shifting shuttle-boxes, two on each side, and hung in separate frames at the sides and independent of the lay, the said four series of shuttle-boxes receiving motion from the loom, or from some first mover in connection with or operating in unison with the loom. When series of shifting shuttle-boxes are employed at the sides of the lay, and in frames separate and independent of the lay, the usual protector; combined with the shipper for stopping the loom when the shuttle fails to pass through, cannot be employed; and with a view to accomplish this important end in this connection the third part of my invention consists in combining with the shipper, or any other stop-motion which may be used as the equivalent thereof, a protector for each series of shuttle-boxes hung and operated in separate frames independent of the lay. As the shuttles pass from the shuttle-boxes to the race-board of the lay, either the ends of the lay must work close to the boxes, or there should be guides from the shuttle-boxes to the ends of the lay to guide the shuttle as it passes from the one to the other; but as the shuttle is not driven "home," sometimes the projection of the shuttle beyond its box will of necessity catch the lay and break some parts of the mechanism.

It is the object of the last part of my invention to provide against this evil; and to this end the last part of my invention consists in combining with the lay and the shuttle-boxes in separate and independent frames by the side of it hinged guides to guide the shuttle from the one to the other, and to yield and thereby prevent breaking whenever a shuttle or any part of it intervenes between the lay and the shuttle box or boxes.

In the several drawings of my said loom for weaving ingrain or various other fabrics I have not exhibited the Jacquard machine, the harneses, nor the cams and treadles by which they are operated; neither have I represented the let-off and take-up machinery or motions, as these make no part of my present invention.

A A represent the two vertical cast-iron ends of the main frame of the loom, the said ends being connected together by any suitable number of horizontal cross-bars, B B, &c. C is the main or driving shaft whose journals are supported and revolve in boxes D D, applied to the tops of two standards, E E. The said main shaft has one fast pulley, G, and one loose pulley, H, arranged upon or near one end of it, as seen in Fig. 1. The band that proceeds from the moving-power and actuates the loom is caused to pass around and made to turn one or the other of the said pulleys, it being thrown upon the fast pulley when the loom is to be put in action and upon the loose pulley when the loom is to be stopped. The said band is to be moved from one to the other by a shifting fork or lever, I, such as is generally used in looms. A toothed pinion, K, on the driving-shaft engages with a large toothed wheel, L, fixed upon the horizontal lay-shaft M, and consequently, when revolved, imparts a rotating movement to the said shaft. Upon the lay-shaft M is another cogged wheel, X, (see Figs. 1, 6,) which engages with a cogged wheel, Y, fixed upon another short horizontal shaft, Z, and thereby when it (the cogged wheel X) revolves it imparts motion to the said shaft Z. The shaft Z has a cogged pinion, $e^3$, affixed upon or near one end of it. The said pinion engages with a gear-wheel, $d^3$, fixed upon a horizontal cam-shaft, $c^3$. The cams by which the Jacquard apparatus is operated are to be placed upon this latter shaft. They are not represented in the drawings, as they constitute no part of my new improvements. The said shaft $c^3$ also imparts motion, by means of two gears, $b^3$ $a^3$, to the mechanism hereinafter described, by which the picker-staffs are thrown or operated.

In order that the relative rotary movements of the several cogged wheels and their shafts may be more fully understood, I would remark that the pinion K is constructed with sixteen teeth, the wheel L, which is actuated by the said pinion, with one hundred and eight, the gear X with fifty, the gear Y with one hundred, the gear $e^3$ with thirty, the gear $d^3$ with sixty, the gear $b^3$ with twenty-five, and the gear $a^3$ with fifty, of said teeth.

The first improvement to be described is the mechanism by which the lay is operated. In this loom the shuttle-boxes being disconnected from the lay require the latter to be moved quicker when it beats up the cloth, also to remain at rest when the shuttles are thrown, all of which is effected by the mechanism which I shall proceed to explain.

N denotes the race-beam of the lay, and O P the swords thereof, the same being attached to the loom-frame in the usual manner. The said lay is operated or moved backward and forward by means of two grooved cams, Q Q, fixed upon the ends of the lay-shaft M, there being one of said cams on each end of said shaft, as seen in the drawings. Each of the said cams is grooved upon its outer face, as seen in Figs. 3 and 4, and more particularly in Fig. 7, which denotes an external or side view of one of the cams as detached from its shaft. Each cam has a small roller, R, placed upon it, as seen in Figs. 4 and 7, the said roller being made to turn or revolve upon a cylindrical pin, S, inserted in and projecting from the cam and between the two extremities of its groove, as denoted in the last-named figure. The said roller projects entirely beyond the groove of the cam and enters and moves in a curved groove or opening, T, made through the sword of the lay, as seen more particularly in Fig. 8, which denotes a view of that part of the inner side of the right sword of the lay in which said groove or passage T is formed. The passage T has an opening, U, at top, and another, V, at bottom, the said openings being for the purpose of allowing the roller R to enter into and depart from the passage T during the revolution of the cam Q. There is another and similar roller, W, similarly applied to the rear side of each sword in the position as seen in the drawings, the said roller being received or acting within the groove of the cam Q during a portion of its revolution.

It is by means of the grooves of the two cams, the passages of the two swords, and their respective rollers, as above described, that the lay is caused to advance, retreat, or remain stationary during proper intervals of time, in order to allow of the change of the warps and operation of the shuttles. The main object in the employment of two cams and two rollers at each end of the lay is to prevent, as far as possible, the wearing of the roller W, which moves in the groove of the cam Q, for it is by means of the said roller that the lay is kept perfectly stationary during the throw of a shuttle, the roller then moving or passing through the concentric part of the groove of the cam Q. This roller should fit well and play so closely in the said concentric part of the groove as to keep the front face of the reed perfectly still and in its proper place during a throw of a shuttle, for were it not so a very trifling forward movement of the lay would cause the shuttle to be thrown out of the loom, or to miss the shuttle-box into which it is to be thrown. When the lay beats up, the roller R, moving in the middle part of the passage T, drives or forces the reed against the filling, and performs such office in the place of the other roller. Therefore all or most of the friction which tends to wear the rollers is thrown upon the roller R, and the difficulty which would soon arise from a reduction of the diameter of the roller W is thus avoided.

The next or succeeding improvement to be described is the manner in which I combine and operate four sets or series of shuttle-boxes. By means of the same arranged and working together, as hereinafter described, I am enabled to adapt my improved loom to the weaving of a great variety of styles and descriptions of goods.

The peculiar nature or character of my improvement to be now explained consists of a combination of four sets or series of shuttle-boxes applied to two pendulous vibrating or moving frames with the lathe between them, and to be disconnected from it, and to alternately move backward and forward in directions parallel to that in which the lathe moves, the said sets of shuttle-boxes, any or all of them, being made at suitable times to rise and fall or move upward or downward, so as to change the positions of the respective shuttle-boxes of the one to those of the other, in the manner as will be hereinafter explained.

The four sets of shuttle-boxes are represented at *d′ d′*, and *c′ c′*, *e′ e′*, &c., as seen in Fig. 1, and at *f′ f′* and *g′*, as seen in Fig. 2. The two former sets—viz., *d′ d′ d′*, &c., *e′ e′ e′*, &c.—are disposed in front of the others, respectively. Each two adjacent sets are applied to one of two vibrating frames, each of which is composed of two rails or bars, *s t* or *u v*, which are kept in their parallel positions by any number of cross rods or bars *c′ c′* extending from one of the said rails to the other, (of either two thereof,) as seen in Fig. 1, and being properly secured to the same. Fig. 10 is a vertical and central section of the two series of shuttle-boxes *d′ d′*, &c., *g′*, while Fig. 11 is a similar section of the series *e′ e′ e′*, &c., *f′ f′*, each section being taken as if the eye of the spectator were directed toward the lathe.

The shuttle-boxes of each set *d′ d′*, &c., *e′ e′*, &c., are made of a series of shelves, *h′ h′*, arranged with regard to one another, and projecting from a plate, *i′*, as represented in the drawings. Each shelf has a plate, *k′*, affixed to its outer or front edge, so as to extend above and below it, as seen in Figs. 1, 10, 11. Each plate *i′* should be applied to its rails *s t* or *u v* in such manner as to slide freely up and down between plates or secondary rails *l′ l′*, fastened to the said rails *s t* or *u v* in the positions as seen in the drawings. A counterbalance-weight, *m′*, is applied to each of said series of shuttle-boxes *d′ d′*, &c., *e′ e′*, &c., by means of a chain, *n′*, which is attached at one end to the top part of the plate *i*, from thence extends upward and is wound several times around a helical-grooved pulley, *o′*, upon a shaft, *p′* or *q′*, thence passes over a grooved pulley, *p′*, in rear of pulley *o′*, and is fastened to the depending counterbalance-weight *m′*, as seen in the drawings. The series *f′ f′* of shuttle-boxes is also to be applied to the frame or rails *s t*, so as to be capable of being raised and lowered by mechanism such as I shall hereinafter describe.

The shuttle-box *g′* is made stationary between its rails *u v;* or instead thereof a series of boxes made to operate like the series *f′ f′* may be employed when the fabric to be wrought requires the same. The vibrating frames which sustain the four series of shuttle-boxes are each to be made by their mechanism to advance or retreat a sufficient distance and in such manner as to alternately bring one of the shuttle-boxes of each series attached to it into range with the race-beam of the lay when the said race-beam has retreated to the utmost allowable extent. The said vibrating frames should be so moved in connection with one another that whenever any one shuttle-box of the front series of shuttle-boxes of the one frame is in range with the race-beam of the lay some one shuttle-box of the rear series of shuttle-boxes of the other frame shall be also in line with the lay. Openings suitable to permit the passage of a shuttle from each shuttle-box of the two series *f′ f′ g′* should be made through the inner rails, *t u*. One of the said openings, or that which belongs to the shuttle-boxes *f′ f′*, is partially exhibited at *r′*, in Fig. 6, the other opening is represented at *s′*, in Fig. 10.

In weaving common two-ply carpeting the shuttles containing the various-colored filling required to form the first or ground ply of the carpet are placed in one of the front series of shuttle-boxes, and the shuttles containing the filling required to form the second or figured ply of the carpet are placed in the other front series of shuttle-boxes, and a thread of filling from each class of colors is alternately introduced into the warps—first a thread from the ground-ply, then a thread from the figured ply, then one for the ground, and so on. Now, by moving the vibratory frames simultaneously in opposite directions and causing the shuttles of either of the front series of boxes to work into their respective back box or series of boxes, as aforesaid, the said two classes of colors are kept separate from each other during the process of weaving and changing the shuttle-boxes.

In weaving styles of two-ply carpets, known as "plain and pillared ground," an even number of threads of any given color is always introduced. Consequently a shuttle thrown from any one of either of the front series of shuttle-boxes always returns to it again before a change is required. Therefore, by moving the front series of shuttle-boxes up and down at proper intervals of time, as hereinafter to be described, (the said front series containing the filling for the second or figured ply,) and allowing the other front series of boxes to remain unchanged as to their vertical position, I can produce any variety of two-ply carpeting of the style known as "plain ground." By moving both of the front series of shuttle-boxes up and down at proper intervals of time, as aforesaid, and allowing the two back series of boxes to remain unaltered as to their vertical positions, I can produce all, or nearly all, the changes required to weave the various patterns of carpeting of the style known as "pillared ground."

In weaving the style of carpets known as "shot about," or "shot and shot" the ground-ply is formed of two or more colors of filling, one thread of each being thrown successively one after the other. This requires that the back set or series of boxes opposite to or working in connection with the front series containing the filling for the ground-ply should be moved up and down, as hereinafter to be described. A still greater variety of changes may be made by moving the vibratory frames backward and forward simultaneously and working the two front series together. Especially is this desirable in weaving some styles of three-ply carpeting. In weaving more simple styles of goods I sometimes allow the vibratory shuttle-frame to remain at rest and work only the front series of boxes.

Having thus described the manner in which the various sets of shuttle-boxes operate with respect to each other, I shall now explain the mechanism by which they are moved, not only back and forth, but upward and downward. The rails or bars *s t* or *u v*, before mentioned as composing part of the vibratory shuttle-box frames, are each supported at its upper end by, and so as to turn or vibrate upon, one of four center pins, *y y*, &c., projecting, respectively, from four standards, *z z*, &c., which extend downward from horizontal frames *a′ a′*, bolted or otherwise properly fastened to the timbers of the top frame, *b′*, extended over the loom. The vibrating shuttle-box frames are vibrated or moved by mechanism as follows: A grooved cam, *a*, is fixed upon the shaft *z* in the position as seen in Figs. 1 and 6, the shape of the said cam and its groove being represented in the latter figure. The groove *b* of the said cam receives a roller, *c*, which projects from the upper part of an arm, *d*, extending upward from and being affixed to a long horizontal shaft, *e*, whose journals near its ends are supported so as to turn in suitable bearings, *f f*, (see Figs. 5 and 6,) projecting from two standards, *g h*. Upon the ends of said shaft two toothed sectors, *i i*, are fixed, as seen in Figs. 3 and 4. The said sectors engage with two toothed wheels, *k k*, arranged and fixed upon horizontal shafts *l m*. The journals of the said horizontal shafts are supported and turn in boxes *n n n n*, applied to the tops of four vertical standards, *g h o o*, (see Fig. 1,) there being two of the said standards to each shaft, as seen in the drawings. Each shaft *l m* has two cranks or arms, *p p* or *q q*, extending from its ends, there being one of the two cranks upon each end of each shaft. Each of the said cranks has a roller, *r*, projecting from its outer side, the said roller turning upon a round pin inserted in the side of the crank. When it is desired to move the vibratory frames simultaneously in opposite directions, as aforesaid, the cranks *p p* of one shaft, *l*, project from it in directions opposite to those in which the cranks *q q* of the other shaft extend therefrom, as will be seen by inspection of Figs. 3 and 4; but when it is desired to move the vibratory frames simultaneously in the same direction said cranks are made to project from their respective shafts in the same direction. Each roller of each of said cranks plays in one of four upright grooves formed or made in the lower parts of four rails, *s t u v*, or in plates *w w*, &c., screwed thereto, a view of the interior face of one of the said plates and grooves being represented in Fig. 9, in which *x* denotes the groove or passage for the roller *r*, the roller being also exhibited therein by dotted lines. Now, when the grooved cam *a* imparts motion to the shaft *e*, the toothed sectors *i i* will act upon the cogged wheels *k*, and thus partially turn the shafts *l m* in their bearings, and in such manner as to cause the outer ends of two of the cranks *p p* or *q q* to move toward the front, and the outer ends of the other two cranks to move toward the rear of the loom. Such movements of the said cranks will make corresponding movements of the rails *s t u v*.

The next portion of the machinery to be described is that by which the two front series of shuttle-boxes, *d d′*, &c., *e′ e′*, &c., are elevated and depressed in the order required during the process of weaving. Upon the lay-shaft M is a cam or wiper, $f^3$, the same being in the position and of the form as seen in Figs. 1 and 6. Above the said cam $f^3$ a lever, $g^3$, is arranged, as seen in the drawings, the said lever turning on a pin or fulcrum, $h^3$, at its inner end, and having a friction-roll, $i^3$, applied to its front end and resting upon the cam $f^3$. The said lever has the lower end of a vertical rod, $k^3$, jointed to it in rear of its roll, as seen in Fig. 6, the upper end of said rod being jointed to the extremity of an arm, $l^3$, which projects from a horizontal shaft, $m^3$, whose journals rest and move in bearings $n^3$ $n^3$, arranged as seen in the drawings. The said shaft $m^3$ should have two more arms, $o^3$ $p^3$, projecting from it in the rear, in the position thereon as seen in Figs. 1 and 2, and of the form and length as denoted in Figs. 5 and 6, the arm $o^3$ being represented in the former figure and the arm $p^3$ in the latter.

As the machinery intervening between the arm $o^3$ and the right series of shuttle-boxes to be moved is substantially similar to that which intervenes between the arm $p^3$ and the left series of such boxes, as will be seen by inspection of the drawings, it will be only necessary to describe that which is immediately connected with the arm $p^3$. The arm $p^3$ has one end of a small connecting-link, $q^3$, jointed to it, (see Fig. 1,) the form of the same corresponding to that of the link $q^3$ of the arm $o^3$, represented in Fig. 5. The other end of the said link is jointed to a frame, $r^3$, which is supported so as to slide up and down upon a vertical rod, $s^3$, properly sustained in position. The said frame $r^3$ carries two depending levers, $t^3$ $u^3$, which are jointed to it at their upper ends, or so that the lower end of each may move freely back and forth toward or from a circular wheel or plate, $v^3$, disposed with respect to the lower ends of said levers, as seen in Figs. 1 and 6, and fixed upon the inner end of the shaft $p'$, which has fixed upon it the helical grooved pulley $o'$, as before described. The said circular plate or wheel has a series of six pins, $w^3$ $w^3$, &c., inserted in and projecting from its inner edge, as seen in Figs. 1, 2, and 6. The said plate has also another series of six pins, $y^3$ $y^3$, &c., (see Fig. 2,) projecting from the opposite side of it and arranged equidistant from each other in a manner similar to that in which the pins $w^3$ $w^3$ on the other side of the plate are disposed, but in positions with regard to said pins $w^3$ $w^3$, as exhibited by dotted circles $y^3$ $y^3$ in Fig. 6.

By inspection of Fig. 6 it will be seen that the lower ends of the levers $t^3$ $u^3$ are notched, as seen at $z^3$ $z^3$. It will also be seen that directly below the wheel $v^3$ there is a stop, $a^4$, which is shaped as seen in the drawings, and plays vertically between guides $b^4$ $b^4$, fastened to the vibrating shuttle-box frame. The said stop is forced upward or against such pins $y^3$ $y^3$ as it may rest in contact with by a helical spring, $c^4$, which rests upon the lower guide $b^4$, and passes against a shoulder or button, $d^4$, fixed upon the shank of the stop. The object of the said stop is to hold the series of shuttle-boxes in their correct position after either of the depending levers $t^3$ $u^3$ has been moved downward and partially revolved the wheel $v^3$, the said correct position insured by the stop pressing at one and the same time against two of the pins $y^3$ $y^3$, &c., and while it so presses against them it prevents the wheel $v^3$ from being turned around by any other power than that of the depending levers $t^3$ $u^3$, whose action upon said plate I shall now proceed more particularly to describe. The two depending levers $t^3$ $u^3$ are connected by a helical spring, $e^4$, one end of which is secured to one and the other end to the other of them, the said spring operating by its contractile force in such manner as to draw the levers $t^3$ $u^3$ toward each other. Each of the said levers has a small bent lever, $f^4$, arranged with respect to it, as seen in the drawings, and turning upon a fixed fulcrum, $g^4$. One arm of the said bent lever $f^4$ bears against the lever to which it belongs, and when raised upward (which takes place when the other arm is depressed) it throws the depending lever away from the wheel $v^3$. The other arm has a chain or cord, $h^4$, attached to it, to which chain or cord a weight, $i^4$, is appended, as seen in Fig. 6, the said weight being of sufficient size to pull down the said arm of the lever and overcome the contractile power of the spring $e^4$, and thereby throw its lever $t^3$ or $u^3$ so far beyond the wheel $v^3$ as not to act upon it (the wheel) when it (the lever) descends, as will be hereinafter described. There being two of the said bent levers $f^4$ $f^4$, each is to be provided with its cord $h^4$ and weight $i^4$, as seen in the drawings.

As a common Jacquard apparatus is to be applied to this loom for the purpose of raising the warp-threads in order to weave figured fabrics, it is intended that the up-and-down movements of the two series of front shuttle-boxes shall be regulated and determined by the same. In order to accomplish the said movements, it will only be necessary to connect the four cords $h^4$ $h^4$, Figs. 1, 5, 6, or their weights, with four of the knot-cords of the Jacquard apparatus, and to prepare the pattern card or cards of said Jacquard apparatus so as to permit of the elevation of the cords $h^4$ $h^4$ $h^4$ $h^4$ or their weights in the order required.

In Figs. 1, 2, 5, and 6 the aforesaid jacquard cords are shown at $k^4$ $k^4$, &c., the Jacquard apparatus being supposed to be disposed above the loom. Now, whenever by the operation of the Jacquard apparatus one of the cords $k^4$ is pulled upward so far as to raise the weight appended to it, the spring $e^4$, being relieved from the action of the weight, will contract and draw inward or toward the wheel $v^3$ the lower end of that lever to the cord of whose bent lever $f^4$ the cord $k^4$ may be attached. It should draw the lower end of said lever so far inward or toward the vertical line passing through the center of the inner face of the wheel $v^3$ as to bring the notch $z^3$ of said lever perpendicularly over one of the pins $w^3$, which projects from the inner face of the wheel $v^3$. Consequently the said lever is forced downward with a sufficient degree of power, its lower end will be pressed against the pin $w^3$ directly beneath it, and will partially turn the wheel $v^3$, the shaft $p'$, and the helical grooved pulley $o'$, and in such manner as to either allow the series of shuttle-boxes suspended to the chain which passes around said pulley $o'$ to descend by the action of gravity a distance equal to that which exists between the bottoms—that is to say, those parts in which the shuttles rest—of either two consecutive shuttle-boxes of the series, or to cause the said series of shuttle-boxes to rise upward a like distance. The said elevation or depression of the series of shuttle-boxes depends upon whether the front or rear depending lever, $t^3$ or $u^3$, is put in action so as to turn the wheel $v^3$. If the front lever, $t^3$, is made to operate on the wheel $v^3$, the series of shuttle-boxes will descend. When the rear lever, $u^3$, operates upon the wheel $v^3$, it causes the said wheel and its shaft $p'$ and pulley $o'$ to partially revolve in an opposite direction, and therefore elevate the series of shuttle-boxes. Whenever the wheel $v^3$ is partially revolved, as above described, one of the two pins $y^3$ which may be directly over the stop $a^4$ will depress the stop until the pin passes the central part of the top of it, when the stop will be raised by the action of the spring $c^4$, and will abut against the said pin and the pin which may be next to it, and which may have been brought into a horizontal or nearly horizontal line with the former.

As the pickers during the process of weaving sometimes fail to free themselves from the shuttle-boxes, and as the shuttles sometimes project from the shuttle-boxes, so as to prevent them from being easily moved, it is very important, in order to prevent accident to or breaking of the machinery, that the power which moves the shuttle-boxes up and down be applied in such a way as to cease to act beyond a certain extent when said contingencies arise. This I effect in the following manner: The cam $f^3$ is employed simply to elevate the lever $g^3$, and thereby raise the frame of the depending levers $t^3$ $u^3$; or, in other words, as said cam $f^3$ produces no depression of the frame of depending levers, (they being made to fall by the action of gravity, as described,) no accident can occur to the mechanism of the loom should a picker at any time project into one of the shuttle-boxes of one of the front series thereof in such manner as to prevent it from moving either up or down. In such a state of things one of the depending levers in its descent would meet and rest upon some one of the pins $w^3$ of the wheel $v^3$, and would remain thereon without exerting any injurious effect upon the series of shuttle-boxes.

As a substitute for the simple cam and weight, operating as above described, I sometimes employ a double or grooved cam, and make the rod $k^3$ in two parts or sections or lengths, jointed together in such manner as to readily pull apart or separate from one another whenever the pickers so prevent the series of shuttle-boxes from moving either up or down, as the case may require.

Having thus described the mechanism for elevating or depressing the two front series of shuttle-boxes, I shall now proceed to set forth and explain that by which the rear series of shuttle-boxes are operated. A cam, $n^4$, Figs. 2, 5, of the shape denoted in Fig. 5, is placed upon the shaft $c^3$. Directly over the said cam a lever, $o^4$, which turns on a fulcrum, $p^4$, is arranged, as seen in Figs. 2, 5. The said lever has a weight, $q^4$, hung upon its front end of sufficient size to raise the shuttle-boxes when the said weight is allowed to descend. It also has a suitable friction-roller, $R^4$, applied to its side, and so as to revolve and rest upon the periphery of the cam. A rod, $n'$, is jointed to the lever $o^4$ near the friction-roller and extends upward and is jointed to an arm, $t^4$, Figs. 2, 3, which projects rearward from a horizontal shaft, $u^4$, arranged so as to be supported and turn in bearings $v^4$ $v^4$ $v^4$, situated as represented in Fig. 3. The said shaft $u^4$ has two arms, $w^4$ $w^4$, projecting from it, as seen in Fig. 2, and toward the front of the loom, as exhibited in Fig. 4, in which one of the said arms may be seen. Rods $x^4$ $x^4$ are respectively jointed at their upper ends to said arms and at their lower ends to the system $f'$ $f'$ of rear shuttle-boxes. In the back series of shuttle-boxes there is the same liability to break the machinery when the pickers or shuttles prevent their free movement as in the front series of shuttle-boxes aforementioned. To avoid accident thereby, I raise said boxes by the power of the weight $q^4$, applied in the manner above described, and allow them to descend again by their own gravity when the action of said weight is overcome by the cam $n^4$, as aforesaid. As the back series of boxes are required to rise and fall at different times relative to the other motions of the loom, according to the style of goods to be wrought, it is obvious that corresponding changes should be made in the cam $n^4$, and as the time in which said boxes are required to operate will be apparent to every practical weaver I do not think it necessary to describe them in detail. The cam should be so shaped as to raise the weight $q^4$ when the boxes are to be depressed, and to allow said weight to descend when the boxes are to be raised.

Although I have described the cam and weight as applied to moving the back series of boxes, it is obvious that they may be applied to moving the front series also when the fabric to be wrought requires but few changes.

The next portion of my improvements is that by which the picker-staffs are operated in the order required to throw the shuttles. A picker, $t'$, is to be applied to each series of shuttle-boxes, the said picker being arranged and made to traverse toward and from the lay, or horizontal rods $u'$ $u'$, disposed in a proper manner with respect to the shuttle-boxes and secured to the vibrating shuttle-box frames $s$ $t$ $u$ $v$. The several pickers are each operated by one of four picker-staffs, $v'$ $w'$ $x'$ $y'$, arranged as seen in the drawings. Each of the front picker-staffs, $v'$ $w'$, is attached to one of the two shafts $z'$ $z'$, Fig. 1, the same being more particularly exhibited in Fig. 12, which represents a vertical and longitudinal section of one of the said shafts, its bearings, and the upper cross-bar, $c'$, of the rails $u$ $v$. The said shaft is sustained in bearings $a^2$ $a^2$ applied to the cross-bar. At its opposite end it has an arm, $b^2$, extending downward from it, the strap $d^2$, by the aid of which the picker-staff is thrown foward, being attached to the lower end of the said arm $b^2$. The back picker-staff, $x'$ or $y'$, of each of the rear pickers is supported at its upper end and turns upon the shaft $z'$. The said rear picker-staffs have straps $c^2$ $c^2$ (see Fig. 2) attached them. Each of the straps of the picker-staffs is attached to one arm of one of a series of four bent levers, $e^2$, arranged upon a transverse shaft or common fulcrum, $f^2$, (see Figs. 1 and 2,) which projects from a standard, $g^2$, secured to the frame-work over the loom. One of the said levers is detached from the shaft or fulcrum, as represented in Fig. 13. One arm of each of said levers extends from the fulcrum toward the right. Two arms of two of the levers project above their fulcrum, and two arms of the other two levers project below it. The said bent levers in conjunction with other mechanism to be described are intended to operate the picker-staffs, which they do through the straps thereof, each of which straps is connected with the extremity of one of the arms of some one of the said bent levers, the right picker-staffs having their straps attached to those two levers which project downward below the fulcrum, while the left picker-staffs have their two straps connected to the arms of the levers which project upward or above the fulcrum, as above described. $h^2$ $i^2$ $k^2$ $l^2$ are a series of rods jointed to and depending from the ends of those arms (of the aforesaid bent levers) which have no straps connected with them. The lower part of each of said rods should have a small hook or shoulder formed upon it, as seen at $m^2$ in Fig. 3. The several hooks or lower parts of the rods are arranged side by side and kept in their correct positions with regard to the frame and other parts of the mechanism by means of a small guide-block, $n^2$, fastened to the end of the main frame. A top view of the said guide-block is represented in Fig. 14, wherein it will be observed that it is drawn with four elongated slots or passages, $o^2$ $p^2$ $q^2$ $r^2$. The rod $h^2$ passes through the passage $o^2$, so with regard to the rods $i^2$ $k^2$ $l^2$, they pass in the same manner through the passages $p^2$ $q^2$ $r^2$, respectively. The passages are made sufficiently long and arranged parallel to one another and to the end of the cast-iron frame in order to allow the lower end of either of the rods $h^2$ $i^2$ $k^2$ $l^2$ to move forward in a direction toward a lever, $s^2$, arranged so as to move up or down in vertical direction and upon a fulcrum or pin, $t^1$, at its front end, as seen in Fig. 3. A top view of the said lever $s^2$ is represented in Fig. 15, and a side view in Fig. 16, the latter also exhibiting a portion of the lower part of the cam Q, situated directly above the lever, as seen in Fig. 3. The said lever $s^2$ has a projection, $t^2$, extending horizontally at right angles to its front end, as seen in Fig. 15; also a curved piece of metal, $u^2$, affixed upon its top at or near its central part, the said piece $u^2$ being of the shape as seen in Fig. 16. A small roller, $v^2$, projects from the left side of the cam Q, as seen in Fig. 1, and also in Fig. 16, and when the cam is revolved it carries the said roller in contact with and raises it entirely over the curved cam piece of metal $u^2$, and by so doing depresses the rear end of the lever. The lever is elevated after the roller $v^2$ ceases to depress it by a spring, $w^2$, (see Fig. 1,) arranged within a case, $x^2$, situated as seen in Fig. 3. Each of the rods $h^2$ $i^2$ $k^2$ $l^2$ has a small cam or projection, $y^2$, extending from its rear side a short distance above its hooked end, the said cam operating in connection with a series of cams or bent arms, $z^2$ $z^2$, &c., which project from that side of a cogged wheel, $a^3$, which is nearest to the main frame of the loom, as seen in Fig. 2, and by dotted lines in Fig. 3. There are two bent arms $z^2$ to each rod $h^2$, &c., the object of said arms or cams being, when the wheel $a^3$ is revolved, to throw the lower ends of the rods $h^2$ $i^2$ $k^2$ $l^2$ forward in regular and proper succession and far enough to carry the hook of each under the projection or bent end $t^2$ of the lever $s^2$, so that when said lever is depressed the said projection, acting upon the said hook, shall at the same time depress the arm of the bent lever $e^2$ (hereinbefore described) to which it may be hung and thereby cause the opposite arm of said bent lever to pull upon its picker-staff strap and operate the picker-staff or cause its lower end to advance toward the lay. Each picker-staff is drawn back or away from the lay by a spring, $f^3$, properly applied to it, as seen in the drawings.

The order in which the shuttles are to be thrown, varies according to the fabric to be wrought, and by transposing the bent arms $z^2$ $z^2$ a corresponding change will be effected. The cogged wheel $a^3$ is revolved by a toothed pinion, $b^3$, fixed upon the end of a horizontal shaft, $c^3$. (See Figs. 1 and 5.) The said shaft has another cogged wheel, $d^3$, fixed upon it, which engages with a cogged pinion, $e^3$, on the shaft $z$, before described. Consequently when the shaft $z$ is revolved motion will be imparted by its pinion $e^3$ to the wheel $d^3$ and shaft $c^3$.

The next portion of the mechanism to be described is that by which the driving-belt is moved from the fast pulley G toward the loose pulley H of the driving-shaft in order to stop the operation of the loom whenever, during the passage of any of the shuttles from one series of their boxes or receptacles to another, its weft-thread may break, or to effect the same whenever a shuttle thrown out of one box on one side of the loom is not properly received into its other box or receptacle upon the opposite side thereof.

In Fig. 1 a horizontal shaft, $y^1$, is represented as extending across the front part of the loom and being supported by bearings at $z^1$ $z^1$. The said shaft has a bent arm, $a^5$, fixed upon its left end, which arm is shaped and extended in front of the shifting-lever I, as exhibited in the drawings. The upper arm of the shifting-lever passes through a horizontal plate, $b^5$, projecting from the loom-frame. A top view of the said plate is represented in Fig. 17, in which $c^5$ denotes a passage formed or made through the said plate for the lever I to pass through and move in. There is a small shoulder or notch, $d^5$, cut or formed in the front side of the said passage. The upper arm of the shifting-lever is to be thrown toward the right and rest against the said shoulder or notch whenever the loom is to be put in action, the position of said lever being maintained by said notch while the loom is in action. The said shifting-lever has a spring, $e^5$, applied to its lower arm and the frame of the loom, and made to act upon it so as to always draw its fork or lower arm toward the loom-frame. Consequently whenever the upper arm of the said lever is thrown out of the notch $d^5$ the lower arm thereof will be drawn toward the loom-frame, or from being directly in front of the fast pulley G into being directly in front of the loose pulley H. As the driving-band passes through the fork at the lower end of the shifting-lever, it will be thus moved from one pulley to the other, all of which will be well understood by manufacturers of looms, as it is a common and well-known mechanical device for changing the driving-belt from one pulley to the other. The arm $a^5$ is pressed against the shifting-lever by the action of a helical spring, $f^5$, properly applied to it. Near the right end of the shaft $y^4$ a small arm, $g^5$, projects downward from said shaft, as seen in Figs. 1 and 5. To the lower end of the said arm a rod, $h^5$, is jointed, and is also jointed to a small sectoral lever, $i^5$, arranged so as to vibrate back and forth upon a center pin, $m^5$, as seen in Fig. 5.

Fig. 18 denotes a vertical section of the sectoral lever $i^5$ and hook $k^5$ over it. The said hook is jointed to the frame of the loom, or plays vertically upon a pin, $l^5$, projecting therefrom. It is arranged directly over and so that its hooked end shall rest upon the sectoral lever, and engages with a notch, $n^5$, made in the top of the curved top part of said sectoral lever, as seen in Fig. 18. Fig. 19 denotes a top view of said hook and other parts connected with it, which are situated in rear of the lay and between the vibrating shuttle-box frames. Fig. 20 is a rear elevation of the same. A long horizontal shaft, $o^5$, extends across the loom in front of the catch or hook $k^5$, as seen in Figs. 19 and 20. It has an arm, $l^5$, projecting from it, as seen in Figs. 19 and 20, the said arm extending under a small projection, $q^5$, from the side of the catch or hook $k^5$. Two forks, $r^5 r^5$, shaped as seen in Figs. 5 and 19, are secured to and project from the shaft $o^5$ near each end of the reed-frame $s^5$ of the lay, as seen in the drawings. The shaft $o^5$ has another arm, $t^5$, extending downward from it in the position and form as seen in Figs. 5 and 19. The said arm $t^5$ has a friction-roller, $u^5$, applied to its front end and resting upon a cam or wiper, $v^5$, which is fixed upon and revolved by the lay-shaft M. The said cam $v^5$ should be so shaped that by its action on the arm $t^5$ it will elevate the forks $r^5 r^5$ to such height above the plates $l^4 m^4$ as to allow a shuttle, when thrown from one side of the loom toward the other side thereof, to freely pass under them, (the forks,) or between them and the plates $l^4 m^4$. It should also be so shaped that as soon as or soon after the shuttle has passed by the two forks it will permit the arm $t^5$ to fall downward far enough to carry the forks down upon and into or through their respective plates $l^4$ $m^4$, there being parallel slots $w^5 u^5 u^5$ cut through each plate $l^4$ $m^4$ to receive the fork and permit it to descend through the plate or below its top surface. While a thread from the shuttle lies on the plates $l^4$ $m^4$ and between them and the forks, it will prevent the forks from descending below the plate or into the slot $u^5$, &c. Should the shuttle during its passage from one shuttle-box to another deposit no thread upon the plates $l^4$ $m^4$ and in the thread of the warp, the forks will fall into the slots, and when this takes place the arm $l^5$ should be so adjusted as to meet the projection $q^5$ of the hook or catch $k^5$ and lift the said catch out of the notch $n^5$ of the sectoral arm. While the hook $k^5$ is in the notch $n^5$ it prevents the arm $a^5$, through the action of the spring $f^5$, from throwing the shifting-lever I out of the notch $n^5$; but as soon as the hook is elevated out of the notch the spring $f^5$ is released and presses the arm $a^5$ against the shifting-lever and expels it from the notch, and thus permits the spring $e^5$ to draw the lower end or fork of the shifting-lever I toward the frame of the loom, and thus thereby change or move the driving band or belt from the fast pulley to and upon the loose one.

The mechanism last described is a common and well-known "stop-motion." It makes no part of my invention; but as certain other machinery to be described is to be connected with it or its hook or catch $k^5$, I have thought it advisable to explain in a somewhat particular manner the operation of it, in order that the parts to be described may be better understood.

Directly underneath the horizontal shaft $o^5$ another horizontal shaft, $w^5$, is arranged, as seen in Figs. 5, 6, and 20. The said shaft is supported so as to turn in any suitable number of bearings, $x^5$ $x^5$, and is of the length as represented in Figs. 2 and 20. It has an arm, $y^5$, projecting rearward from it, and underneath a small pin, $z^5$, projecting from the side of the hook or catch $k^5$, before described. The said shaft $w^5$ also has another arm, $a^6$, extending downward from it and toward the front of the loom, as seen in Figs. 5 and 20, the said arm having a suitable friction-roller, $b^6$, applied to its front end. The said friction-roller rests and travels upon the periphery of a cam or wiper, $c^6$, fixed upon the lay-shaft M and by the side of the cam $v^5$, before described. Each extremity or end of the shaft $w^5$ has an arm, $d^6$, fixed upon it and extending from it toward the front of the loom, a side elevation of the said arm and certain parts directly below it being represented in Fig. 21. A top view of the said arm is given in Fig. 22. Each arm $d^6$ has two small studs or projections, $e^6$ $f^6$, extending from it toward the vibrating shuttle-box-frame rail $t$ or $u$ next to it. The said arm $d^6$ is intended to act in conjunction with two upright arms, $g^6$ $h^6$, which are attached, respectively, to two horizontal and parallel shafts, $i^6$ $k^6$, extending between and through the rails $s$ and $t$ or $u$ and $v$, and in the position as represented in Figs. 2, 10, and 11. An arm, $l^6$, extends upward from each shaft $i^6$, and so that its upper end shall be just in rear of the end of one of a series of spring-plates, $m^6$ $m^6$. Fig. 23 denotes a horizontal or nearly horizontal section taken through the top of the arm $l^6$ and the shuttle-boxes of the two series in front and rear of it. Each shuttle-box of the two front and two rear series is provided with a shuttle-binder, $m^6$, shaped in horizontal sections, as seen in Fig. 23. Each of the said shuttle-binders is hinged at one end to the shuttle box or frame, which makes part of it. It is placed in a rectangular aperture, $n^6$, cut or formed through the side of the shuttle-box, as seen in Fig. 24, which represents the rear side of one of the shuttle-boxes, or a portion of the plate $i'$ composing it, having the aperture $n^6$ formed through it and without the shuttle-binder applied to it. The binders $m^6$ are forced toward the interior of their respective shuttle-boxes by springs $o^6$ $o^6$, &c., Fig. 2, each binder $m^6$ being provided with a spring, which has one end secured to the shuttle-box and the other resting and pressing against the binder $m^6$. Each plate $m^6$ has its front face shaped to a very obtuse angle, and projects into the interior of the shuttle-box, as seen at $p^6$ in Fig. 23. Whenever a shuttle is thrown into one of the shuttle-boxes of either of the two front series thereof, it comes into contact with the angular part $p^6$ of the shuttle-binder, which projects into the box, and as said angular part is made to project into the box or path of the shuttle, and the shuttle is calculated in its width to correspond as nearly as may be with the width of the box which receives it, it (the shuttle) will force back or move the binder $m^6$ out of its way, and by so doing cause the said spring-plate to bear against the top of the arm $l^6$, and thereby turn the shaft $i^6$ a little in its bearings and so as to move the top of the arm $g^6$ a little rearward or in a direction toward the shaft $w^5$. The shaft $i^6$ should have a spring, $q^6$, applied to it and the rail $v$ or $s$ in such manner as to operate upon the shaft and carry or move the top of the arm $g^6$ forward or away from the shaft $w^5$ whenever the shuttle leaves the shuttle-box, or while there is no shuttle in said shuttle-box. Each of the rear series of shuttle-boxes has its shuttle-binder, as seen at $m^6$, in the section thereof in Fig. 23. The said shuttle-binders operate against an arm, $r^6$, which projects upward from a shaft, $k^6$, and is arranged thereon as seen in Fig. 2, the top or upper part of said arm $r^6$ being exhibited in Fig. 23. When a shuttle is thrown into one of the rear shuttle-boxes it presses the shuttle-binder $m^6$ of said shuttle-box forward or in a direction toward the front of the lay. Consequently the top part of the arm $r^6$ will be moved by said plate $m^6$ in the same direction and will turn the shaft $k^6$ a little in its bearings, and thereby move the top part of the arm $h^6$ forward or toward the front of the loom. The cam $c^6$ should be concentric, with the exception of an angular depression, $s^6$, the said angular depression being suitable to allow the arm $a^6$ to descend far enough to cause the arm $y^5$ to rise upward and bear against the pin $z^5$ and throw the hook or catch $k^5$ out of the notch $n^5$ of the sectoral arm, before described. The said cam should be so adjusted upon its shaft as to admit of the complete fall of the arm $a^6$ immediately after the instant of time of a completion of a throw or passage of a shuttle over the race-beam and the reception of said shuttle in the shuttle-box into which it may be thrown. While the shuttle passes freely and properly from one shuttle-box on one side of the loom to another on the opposite side thereof, the arm $a^6$ should be prevented from falling so far as to raise the catch $k^5$ out of the notch $n^5$ and thereby stop the loom from operating. It is for this purpose that I employ the arm $d^6$, with its projections $e^6$ $f^6$, to act in conjunction with the upright arms $g^6$ $h^6$ of the shafts $i^6$ $k^6$, before described.

The peculiar manner in which said parts of the mechanism on each side of the loom operate in connection with one another I shall now proceed to explain.

It has been hereinbefore specified that the vibrating shuttle-box frames $s$ $t$ and $u$ $v$ are each vibrated or alternately moved first in one direction and then in its opposite. While a shuttle-box of front series is in range with the race-beam of the lay another of the back series at the opposite end of the loom is also in range with the said race-beam. One of the projections $e^6$ $f^6$ of each arm $d^6$ should be so adjusted upon the arm that when either one of the front series of shuttle-boxes receives a shuttle it (the projection) shall, on the fall of the arm $d^6$, which takes place when the roll of the arm $a^6$ descends into the depression $s^6$, come directly over and rest upon the top of the arm $g^6$, belonging to the shaft $i^6$ of the shuttle-box which receives the shuttle. This deposit of the projection on the top of the arm should take place as soon as the shuttle has fairly and fully entered the shuttle-box, and by so doing pressed against the shuttle-binder $m^6$ of said shuttle-box, and moved the same as before described, and in consequence thereof produced a slight rearward movement of the arm $g^6$ of the shaft $i^6$, as hereinbefore described. By said rearward movement of the arm $g^6$, or its upper part, it should be brought into a correct position to receive the projection from the arm $d^6$, and when the said projection so rests upon the top of said arm the arm should be long enough to prevent the arm $y^5$ of the shaft $w^5$ from pressing against the pin $z^5$, so as to raise the hook or catch $k^5$ out of the notch $n^5$, and thereby cause a stoppage of the loom. The said projection from the arm $d^6$ should be so adjusted to the top of the arm $g^6$, with which it operates, that whenever a shuttle, when thrown, fails to enter the shuttle-box and the arm $d^6$ descends it (the projection) shall not meet the arm $g^6$, which in this case experiences no movement arising from the action of the shuttle against the binder of the shuttle-box, but pass below its top, and by so doing permit the arm $y^5$ to be borne upward against the pin $z^5$ of the hook or catch $k^5$, and thus by pressure against the hook, the said pressure being produced by the weight of the arm $a^6$, cause the elevation of the hook out of the catch $n^5$, and of course the immediate stoppage of the loom.

From the above it will be seen that if the shuttle, when thrown, does not fully and properly enter the shuttle-boxes of the front series no movement of the arm $g^6$ takes place; or, in other words, the said arm is not moved into a position necessary to receive upon its top the projection from the arm $d^6$ when said arm descends during the time the roll of the arm $a^6$ passes down the depression of the cam $c^6$. Each of the other projections upon the two arms $d^6$ should be similarly adjusted and adapted to operate in connection with the arm $h^6$ adjacent to it when either of the rear series of shuttle-boxes immediately adjacent to said projection and said arm $h^6$ is in range of the race-beam and in the act of receiving a shuttle.

That position of the loom which relates to the arrest of the shuttle when it has arrived at a certain position in one of the shuttle-boxes of one of the series which moves up and down and allows the picker to free itself from the pointed end of the said shuttle, so that the picker may present no impediment to the movement of the series of shuttle-boxes, either upward or downward, is as follows: Each of the front series of shuttle-boxes has a spring-lever, $x^6$, Figs. 1, 3, 4, applied to its vibrating frame and moving upon a pin or fulcrum, $y^6$, projecting therefrom in the position denoted by the drawings. The upper part or arm of said lever should be made as a spring, and at its upper end should be placed in such a position as to admit of the picker being forced against it whenever the said picker is struck by a shuttle on entering one of the shuttle-boxes. The lower end of the spring-lever should be inserted in a vertical groove or elongated passage of a guide-cup, $z^6$. A top view of this guide-cup is exhibited in Fig. 25, and a vertical, central, and longitudinal section of it in Fig. 26. The elongated passage is represented in said figure at $a^7$. The said guide-cup should be bolted or fastened upon the floor upon which the loom stands and in such a position that a vertical plane passing through the central part of the passage $a^7$, and from end to end of it, shall make an acute angle with the vertical plane passing through and in line of the axis of the fulcrum or pin upon which the spring-lever $x^6$ moves, the said vertical plane being parallel to either end of the main frame of the loom, the said guide-cup being also arranged in such manner that its rear end shall be a distance from the said end of the frame of the loom greater than that of its front end therefrom. Such an arrangement of the guide-cup will, when the front series of shuttles to which it is immediately adjacent retreats in order to receive a shuttle from the opposite part of the loom, cause the lower end of the spring-lever $x^6$ to be moved in such a manner as to carry the upper end of the said spring-lever in a direction toward the lay. Consequently when the shuttle is thrown into the shuttle-box the picker will be forced by it against the upper part of the spring-lever, which will constitute a stop, as it were, to arrest the further progress of the shuttle. When the shuttle-boxes advance so as to bring one of the rear series of shuttle-boxes into range with the race-beam, the passage $a^7$ of the guide-cup $z^6$, will cause the lower end of the spring-lever to advance toward the end of the lay as the said end passes or moves through the said passage. This will cause a retreat of the upper end of the spring-lever, or a movement of it away from the picker, and in consequence thereof will allow the spring which causes the picker-staff to retreat after each throw of a shuttle to act upon the picker-staff and the picker in such manner as to move the picker upon its supports or rods and a short distance away from the end of the shuttle, the said distance being far enough to entirely clear the end of the shuttle when the series of shuttle-boxes are moved upward or downward from the picker, thereby preventing any rupture of any part of the machinery which might occur by reason of the point of the shuttle being in too close contact or proximity with the picker when the shuttle-boxes are moved either upward or downward.

It is well-known that after the picker has been a short time in action the pointed end of the shuttle makes an indentation in it, and as said pointed end might extend too far within the said indentation, whenever it should be required to move the shuttle-boxes upward or downward it becomes necessary to move the picker far enough away from the point of the shuttle to admit of the elevation or depression of the shuttle-boxes without accident.

In order that the manner in which the spring attached to the picker-staff actuates the picker or forces it away from the shuttle whenever the shuttle-frames advance or come forward may be understood, I have in Figs. 1, 2, 3 represented a picker and its mode of connection with the picker-staff. In said figures $t$ denotes the picker, which is connected with the picker-staff over it by means of a stiff strip of iron, $c^7$, which is jointed or hinged to both picker-staff and picker. Consequently the said spring which causes the retreat of the picker-staff can act upon the picker through the connecting-strip $c^7$, and move it upon its rods or supports whenever the upper part of the spring-lever $x^6$ is moved in a direction away from the picker.

If desirable, each of the four series of shuttle-boxes may be provided with a spring-lever and guide-cup or other mechanical equivalents, for the purpose above described.

In Fig. 2, $d^7$ $d^7$ denote springs fixed to the rails $s$ and $v$, respectively, and in regard to the back shuttle-boxes, as seen in the drawings, the said springs being for the purpose of arresting the progress of a shuttle when thrown into one of the rear shuttle-boxes.

The next or succeding part of my invention consists in certain turning guide-plates applied to certain parts of the loom-frame in order to prevent accidents from occurring to the loom or a shuttle whenever the latter projects from a shuttle-box. Should the shuttle in its passage into a shuttle-box not fully enter the same, a serious injury to the loom would be likely to occur, when the vibrating frame *s t* or *u v*, by which the shuttle-box may be sustained, should move rearward, as that part of the shuttle which would protrude from the box would be carried in contact with one of the vertical plates $t^6$ $u^6$ (see Figs. 1, 19) which project above and at the rear part of the plates $l^4$ $m^4$. Such contact must either seriously injure the shuttle or some of the mechanism of the loom. To prevent an accident of this kind from happening, each of the said vertical plates $t^6$ $u^6$ should be applied to its plate $l^4$ or $m^4$ in such manner as to turn or move horizontally upon a pin, or proper mechanical equivalent, projecting upward from the plate $l^4$ or $m^4$ in the position as seen at $v^6$ in Figs. 1, 19. A spring, $w^6$, is placed in rear of each plate $t^6$ $u^6$ and is confined to the plate $l^4$ or $m^4$, upon which the movable plate $t^6$ or $u^6$ may be situated. The said spring should be made to bear against the plate $t^6$ or $u^6$ which it may be in rear of, and keep it up to its position proper to guide a shuttle into the shuttle-box, the said position being determined by a small projection or screw-pin, $x^7$, which extends downward from the outer end of the plate $t^6$ or $u^6$, and is made to abut against any suitable part of the plate $l^4$ or $m^4$ upon which the plate $t^6$ or $u^6$ may be situated. The turning-pin upon which the plate moves is placed at that end of the said plate which is most distant from the shuttle-boxes immediately adjacent to the plate. The spring $w^6$, which acts upon the plate $t^6$ or $u^6$, should be so made and applied to the plate as to admit the same to retreat far enough to prevent accident whenever a shuttle projects from a shuttle-box and is borne against the spring-plate by the retreat of the vibrating frame carrying said shuttle-box.

What I claim as my invention, and desire to secure by Letters Patent, is—

1. Combining with the lay of a power-loom, and on each side thereof, two cams and two rollers, or their equivalents, one of said cams for working the lay and the other for holding it in a stationary position during the throw of the shuttle, substantially in the manner and for the purpose specified.

2. The employment of two series of shifting shuttle-boxes on one or both sides of the lay, hung and operated in separate and independent frames on each side of the lay of the loom, the said boxes being shifted and otherwise operated by machinery receiving motion from the loom, or from some first or other mover working in unison with the power-loom, substantially as herein described, and for the purpose specified.

3. Combining with the shipper for stopping the loom when the shuttle fails to pass through, or the equivalent thereof, a protector for each series of shifting shuttle-boxes hung in separate frames independent of the lay, substantially as described and for the purpose specified.

4. In combination with the lay of the loom and shuttle-boxes hung in separate frames independent of the lay, the employment of jointed guides, substantially as described, for guiding the shuttles in their passage from the shuttle-boxes to the lay, and vice versa, and which yield to prevent breaking when the shuttle fails to pass entirely through, substantially as described.

E. B. BIGELOW.

Witnesses:
JAMES STEWART,
CHS. G. STEVENS.